US012162508B2

(12) United States Patent
Nakatsuka et al.

(10) Patent No.: US 12,162,508 B2
(45) Date of Patent: Dec. 10, 2024

(54) DRIVING ASSISTANCE DEVICE, VEHICLE, DRIVING ASSISTANCE METHOD, AND STORAGE MEDIUM (71) Applicants: HONDA MOTOR CO., LTD., Tokyo (JP); HITACHI ASTEMO, LTD., Hitachinaka (JP)

(72) Inventors: Masayuki Nakatsuka, Wako (JP); Takeshi Kibayashi, Wako (JP); Keiichiro Nagatsuka, Hitachinaka (JP); Hirofumi Ikoma, Hitachinaka (JP)

(73) Assignees: HONDA MOTOR CO., LTD., Tokyo (JP); HITACHI ASTEMO, LTD., Hitachinaka (JP)

( * ) Notice: Subject to any disclaimer, the term of this patent is extended or adjusted under 35 U.S.C. 154(b) by 87 days.

(21) Appl. No.: 18/101,155

(22) Filed: Jan. 25, 2023

(65) Prior Publication Data
US 2023/0242140 A1 Aug. 3, 2023

(30) Foreign Application Priority Data

Feb. 1, 2022 (JP) .................................. 2022-014403

(51) Int. Cl.
*B60W 50/14* (2020.01)
*G06V 20/58* (2022.01)

(52) U.S. Cl.
CPC ............ *B60W 50/14* (2013.01); *G06V 20/584* (2022.01); *B60W 2050/143* (2013.01); *B60W 2050/146* (2013.01); *B60W 2420/403* (2013.01)

(58) Field of Classification Search
CPC ............ B60W 50/14; B60W 2050/143; B60W 2050/146; B60W 2420/403; G06V 20/584
See application file for complete search history.

(56) References Cited

U.S. PATENT DOCUMENTS

| 9,975,551 | B2 | 5/2018 | Kido |
| 10,380,438 | B2 * | 8/2019 | Fung ................. G08G 1/09623 |
| 10,713,817 | B2 * | 7/2020 | Oliva-Perez ........... B60Q 9/008 |
| 11,990,038 | B2 * | 5/2024 | Wakayama .......... G06V 20/584 |

(Continued)

FOREIGN PATENT DOCUMENTS

| JP | 2007034693 A | 2/2007 |
| JP | 5883833 B2 | 3/2016 |

(Continued)

OTHER PUBLICATIONS

Japanese Office Action for Japanese Patent Application No. 2022-014403 mailed Nov. 6, 2023.

*Primary Examiner* — Hoi C Lau
(74) *Attorney, Agent, or Firm* — Thomas | Horstemeyer, LLP (57) ABSTRACT

A driving assistance device comprises: a recognition unit configured to recognize a lighting color of a traffic light from an image captured by a camera that images an outside world of a vehicle; and an alarm output unit configured to output an alarm to a driver of the vehicle when the lighting color is red and there is no braking operation of the vehicle. When a plurality of traffic lights are recognized from the image by processing of the recognition unit, the alarm output unit controls the output of the alarm based on a combination of lighting colors of the plurality of traffic lights.

9 Claims, 7 Drawing Sheets

(56) References Cited

U.S. PATENT DOCUMENTS

| | | | |
|---|---|---|---|
| 2014/0125794 A1* | 5/2014 | Kanou | G06V 20/58 |
| | | | 348/113 |
| 2015/0039202 A1* | 2/2015 | Kido | G06V 20/584 |
| | | | 701/93 |
| 2017/0043715 A1* | 2/2017 | Osugi | B60Q 9/00 |
| 2018/0154870 A1* | 6/2018 | Kurata | B60T 7/12 |
| 2018/0253613 A1* | 9/2018 | Fung | G06V 20/584 |
| 2019/0035276 A1* | 1/2019 | Zruya | G08G 1/162 |
| 2019/0295292 A1* | 9/2019 | Oliva-Perez | B60R 11/04 |
| 2022/0262244 A1* | 8/2022 | Wakayama | G08G 1/07 |
| 2023/0242140 A1* | 8/2023 | Nakatsuka | B60W 30/18159 |
| | | | 340/425.5 |
| 2023/0245470 A1* | 8/2023 | Nakatsuka | B60W 50/16 |
| | | | 382/104 |
| 2024/0051504 A1* | 2/2024 | Jeong | G06V 20/588 |

FOREIGN PATENT DOCUMENTS

| | | |
|---|---|---|
| JP | 2018092371 A | 6/2018 |
| JP | 2023057322 A | 4/2023 |

* cited by examiner

LIGHTING COLOR OF FIRST CANDIDATE TRAFFIC LIGHT

|  | UNKNOWN | RED | YELLOW | GREEN |
|---|---|---|---|---|
| UNKNOWN | NONE | FIRST CANDIDATE | FIRST CANDIDATE | FIRST CANDIDATE |
| RED | SECOND CANDIDATE | FIRST CANDIDATE | NONE | NONE |
| YELLOW | SECOND CANDIDATE | NONE | FIRST CANDIDATE | NONE |
| GREEN | SECOND CANDIDATE | NONE | NONE | FIRST CANDIDATE |

LIGHTING COLOR OF SECOND CANDIDATE TRAFFIC LIGHT

FIG. 8

DRIVING ASSISTANCE DEVICE, VEHICLE, DRIVING ASSISTANCE METHOD, AND STORAGE MEDIUM

CROSS-REFERENCE TO RELATED APPLICATION(S)

This application claims priority to and the benefit of Japanese Patent Application No. 2022-014403 filed on Feb. 1, 2022, the entire disclosure of which is incorporated herein by reference.

BACKGROUND OF THE INVENTION

Field of the Invention

The present invention relates to a driving assistance device, a vehicle, a driving assistance method, and a storage medium.

Description of the Related Art

Japanese Patent No. 5883833 discloses a vehicle exterior environment recognition device that identifies a traffic light as a control input target. In the vehicle exterior environment recognition device, among a plurality of identified traffic lights, all traffic lights having identical lighting colors are set as control input targets, and all traffic lights having different lighting colors are not set as control input targets.

However, when, as one of the plurality of traffic lights, for example, a traffic light on the side of an intersection road intersecting with a self-vehicle road on which a self-vehicle travels is included, the traffic light on the side of the self-vehicle road and the traffic light on the side of the intersection road may not necessarily have the identical lighting colors. In addition, there may also be a case where the lighting color of the traffic light is unknown, for example, a case where the lighting color of the traffic light cannot be accurately recognized due to factors such as an influence of an intersection angle between the self-vehicle road and the intersection road, a road environment of a surrounding environment, the presence of a preceding vehicle having a high vehicle height, and weather conditions such as snowfall.

In technology disclosed in Japanese Patent No. 5883833, when the lighting color of the traffic light on the side of the self-vehicle road is different from the lighting color of the traffic light on the side of the intersection road, or when the lighting color of the traffic light on the side of the intersection road is unknown, all traffic lights are not set as the control input targets.

In such a case, in the technology disclosed in Japanese Patent No. 5883833, a driving assistance function of outputting an alarm to a driver in a state where the lighting color of the traffic light is red and there is no braking operation does not operate. Even under the influence of the various factors described above, provision of driving assistance technology with enhanced alarm output performance is required from the viewpoint of preventive safety.

The present invention provides driving assistance technology capable of controlling output of an alarm based on a combination of lighting colors of a plurality of traffic lights when the plurality of traffic lights are recognized.

SUMMARY OF THE INVENTION

According to one aspect of the present invention, there is provided a driving assistance device comprising:

a recognition unit configured to recognize a lighting color of a traffic light from an image captured by a camera that images an outside world of a vehicle; and an alarm output unit configured to output an alarm to a driver of the vehicle when the lighting color is red and there is no braking operation of the vehicle, wherein, when a plurality of traffic lights are recognized from the image by processing of the recognition unit, the alarm output unit controls the output of the alarm based on a combination of lighting colors of the plurality of traffic lights.

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Figure 1:
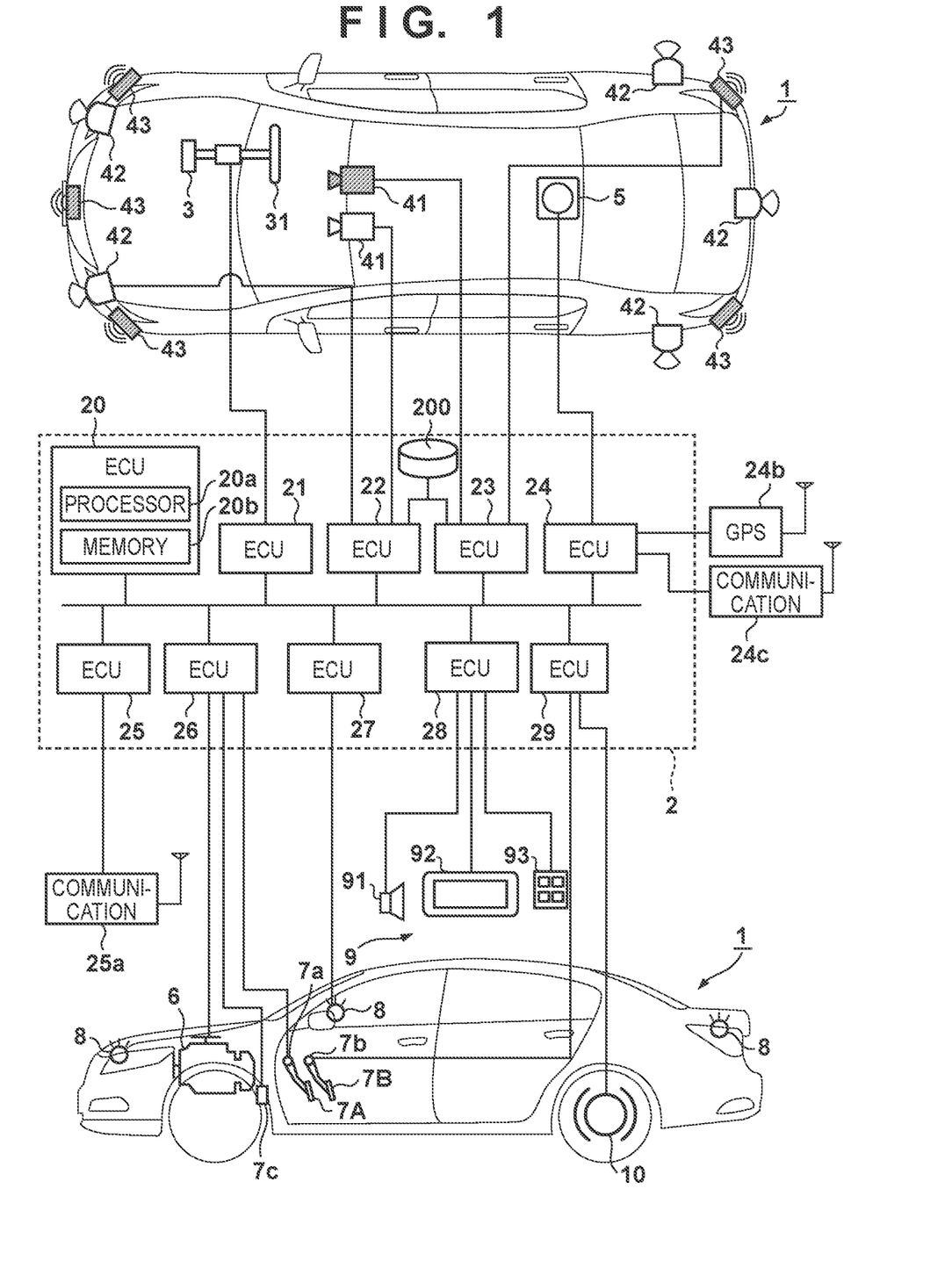
FIG. 1 is a block diagram illustrating a configuration example in which a functional configuration of a driving assistance device is provided in a vehicle.

FIG. 1 is a block diagram illustrating a configuration example in which a driving assistance device 2 according to the present embodiment is provided in a vehicle 1. In FIG. 1, the vehicle 1 is schematically illustrated in a plan view and in a side view. The vehicle 1 is, for example, a sedan-type four-wheeled passenger vehicle.

The driving assistance device 2 of FIG. 1 controls each unit of the vehicle 1. The driving assistance device 2 includes a plurality of electronic control units (ECUs) 20 to 29 communicably connected by an in-vehicle network. Each ECU includes a processor represented by a CPU, a storage device such as a semiconductor memory, an interface with an external device, and the like. The storage device stores a program executed by the processor, data used for processing by the processor, and the like. Each ECU may include a plurality of processors, storage devices, interfaces, and the like. For example, the ECU 20 includes a processor 20a and a memory 20b. The ECU 20 executes processing by the processor 20a executing a command included in a program stored in the memory 20b. Alternatively, the ECU 20 may include a dedicated integrated circuit such as an ASIC for the ECU 20 to execute processing. A similar configuration applies to the other ECUs.

Functions assigned to each of the ECUs 20 to 29 will be described hereinbelow. Note that the number of ECUs and the functions assigned to the ECUs can be designed as appropriate for the vehicle 1, and can be subdivided or integrated as compared with the present embodiment.

The ECU 20 executes vehicle control related to automated driving of the vehicle 1 (self-vehicle) according to the present embodiment. In the automated driving, steering of the vehicle 1, a lane change, and acceleration or deceleration are controlled in an automated manner. Processing regarding specific control for the automated driving will be described in detail later.

The ECU 21 controls an electric power steering device 3. The electric power steering device 3 includes a mechanism that steers front wheels in response to a driver's driving operation (steering operation) on a steering wheel 31. The electric power steering device 3 includes, for example, a motor that exerts a driving force for assisting a steering operation or automatically steering the front wheels, and a sensor that detects a steering angle. When a driving state of the vehicle 1 is automated driving, the ECU 21 automatically controls the electric power steering device 3 in response to an instruction from the ECU 20 and controls a traveling direction of the vehicle 1.

The ECUs 22 and 23 control detection units 41 to 43 that detect a surrounding state of the vehicle, and perform information processing of the detection results. The detection unit 41 is an image capturing device that detects an object in front of the vehicle 1 by image capturing (hereinafter, referred to as a camera 41 in some cases). In the case of the present embodiment, the camera 41 is installed inside a windshield and in a front part of a roof of the vehicle 1 such that images can be captured in the front of the vehicle 1. The ECUs 22 and 23 can extract a contour of a target such as a traffic light located in front of the vehicle 1, extract the traffic light, and acquire a lighting color (red, yellow, or green) of the extracted traffic light by analyzing the image captured by the camera 41 (image processing).

The detection unit 42 (LIDAR detection unit) is a light detection and ranging (LIDAR) (hereinafter, referred to as the LIDAR 42 in some cases), detects a target around the vehicle 1 by light, and measures a distance to the target. In the case of the present embodiment, five LIDARs 42 are provided, including one at each corner portion of a front part of the vehicle 1, one at the center of a rear part of the vehicle 1, and one at each lateral side of the rear part of the vehicle 1.

The detection unit 43 (radar detection unit) is a millimeter-wave radar (hereinafter, referred to as the radar 43 in some cases), detects a target around the vehicle 1 by radio waves, and measures a distance to the target. In the case of the present embodiment, five radars 43 are provided, including one at the center of the front part of the vehicle 1, one at each corner portion of the front part of the vehicle 1, and one at each corner portion of the rear part of the vehicle 1.

The ECU 22 controls one camera 41 and each LIDAR 42, and performs information processing of detection results. The ECU 23 controls the other camera 41 and each radar 43, and performs information processing on detection results. Two sets of devices for detecting surrounding states of the vehicle 1 are provided, so that the reliability of the detection results can be improved. Different types of detection units such as a camera, a LIDAR, and a radar are provided, so that a surrounding environment of the vehicle 1 can be analyzed in multiple ways. Hereinafter, the LIDAR 42 and the radar 43 are also referred to as the detection units (42 and 43).

In the present embodiment, each of the ECU 22 and the ECU 23 functions as a recognition unit, and recognizes the display of the traffic light from the image of the outside of the vehicle 1 captured by the camera 41 (image capturing unit). Here, the display of the traffic light includes lighting colors (red, yellow, and green) of the traffic light. The ECU 22 and the ECU 23 are also referred to as first processors.

Figure 7:
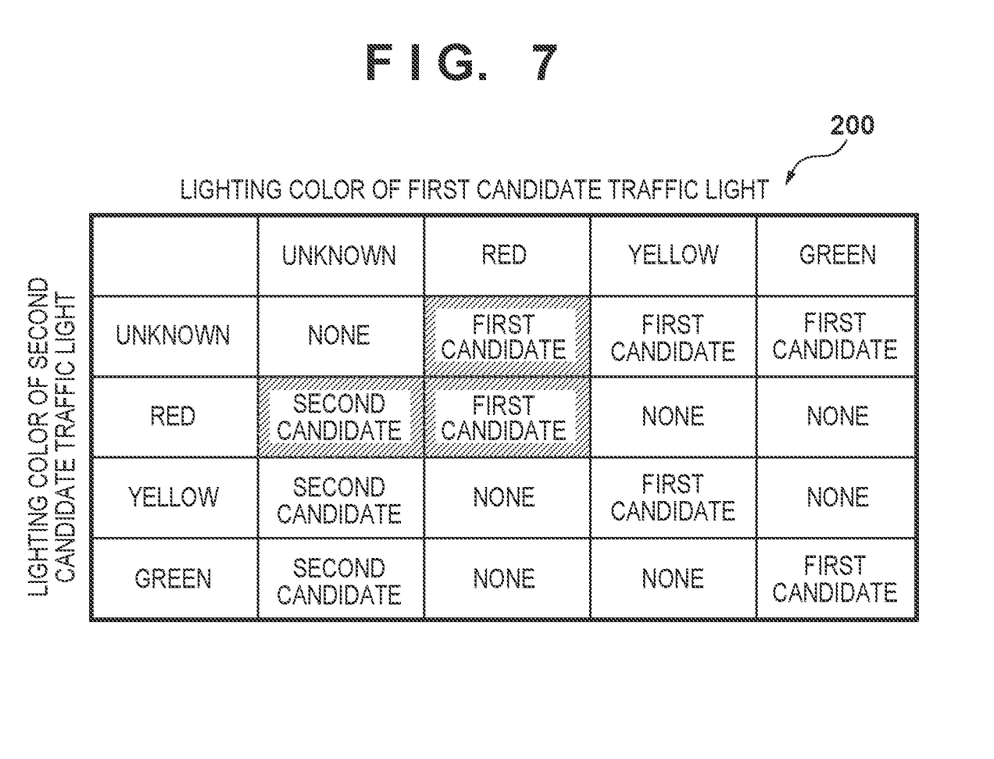
FIG. 7 is a diagram illustrating a configuration example of data stored in a database.

The ECU 22 and the ECU 23 can access a database 200 constructed in the storage device. FIG. 7 is a diagram illustrating a configuration example of data stored in the database 200. For example, when a first candidate traffic light and a second candidate traffic light are recognized as a plurality of traffic lights from an image, the ECU 22 and the ECU 23 can determine a traffic light (hereinafter, referred to as the target traffic light) to be used for control of the driving assistance device 2, based on a combination of lighting colors (color information) of the plurality of traffic lights. Note that the database 200 can be disposed on a network, and the ECU 22 and the ECU 23 can also acquire color information from the database 200 on the network via a communication device 24c. Processing using the database 200 will be described later.

The ECU 24 performs control of a GPS sensor 24b and the communication device 24c and information processing of a detection result or a communication result. The GPS sensor 24b detects a current position of the vehicle 1. The communication device 24c performs wireless communication with a server that provides map information and traffic information, and acquires these pieces of information. The ECU 24 searches for a route from the current location to the destination. The ECU 25 includes a communication device 25a that can conduct vehicle-to-vehicle communication or road-to-vehicle communication, or that can communicate with an information processing device such as a smartphone.

The ECU 26 controls a power plant 6. The power plant 6 is a mechanism that outputs driving force for rotating the driving wheels of the vehicle 1 and includes an engine and a transmission, for example. Note that the configuration of the power plant 6 is not limited to this example, and the power plant 6 may include an electric vehicle equipped with an electric motor as a power source and a hybrid vehicle equipped with an engine and an electric motor. Of these examples, the electric vehicle is driven by electric power discharged from a battery, such as a secondary battery, a hydrogen fuel cell, a metal fuel cell, or an alcohol fuel cell, for example.

For example, the ECU 26 controls the output of the engine in response to a driver's driving operation (accelerator operation or acceleration operation) detected by an operation detection sensor 7a provided on an accelerator pedal 7A, and switches a gear ratio of the transmission based on information such as a vehicle speed detected by a vehicle speed sensor 7c. In a case where the driving state of the vehicle 1 is the automated driving, the ECU 26 controls the power plant 6 in an automated manner in response to an instruction from the ECU 20, and controls the acceleration or deceleration of the vehicle 1.

The ECU 27 controls a lighting device (headlight or taillight) including a direction indicator 8 (blinker). In the example of FIG. 1, the direction indicator 8 is provided on front parts, door mirrors, and rear parts of the vehicle 1.

The ECU 28 controls an input and output device 9. The input and output device 9 outputs information to occupants including a driver, and receives the input of information from the occupants. A voice output device 91 notifies the occupants of information with a voice. A display device 92 notifies the driver of information by displaying an image. The display device 92 is, for example, disposed in front of a driver's seat and a passenger's seat, and constitutes an instrument panel of a touch panel type or the like functioning as a human-machine interface. An input device 93 is disposed at a position operable by the driver, and includes a switch group for inputting an instruction to the vehicle 1 and a voice input device for inputting occupant's voices.

In the present embodiment, the ECU 28 functions as an alarm output unit that outputs an alarm to the driver of the vehicle 1. The ECU 28 can output an alarm to the driver by screen display by controlling the display device 92. The ECU 28 is also referred to as a second processor. The ECU 28 can also control the voice output device 91 and the display device 92 to output an alarm to the driver by screen display and voice output.

Note that, as the alarm output to the driver, information may be notified by combining information by vibration or light, in addition to the screen display or the voice output. Furthermore, depending on a level (for example, a degree of urgency) of the alarm output to be notified, the combination may be changed or the alarm output mode may be changed.

The ECU 29 controls a brake device 10 and a parking brake (not illustrated). The brake device 10 is, for example, a disc brake device, is provided on each wheel of the vehicle 1, and applies resistance against a rotation of the wheel to decelerate or stop the vehicle 1. The ECU 29 controls operations of the brake device 10 in response to a driving operation (braking operation) performed by the driver and detected by an operation detection sensor 7b provided on a brake pedal 7B, for example. In a case where a driving state of the vehicle 1 is the automated driving, the ECU 29 automatically controls the brake device 10 in response to an instruction from the ECU 20, and controls the deceleration and stop of the vehicle 1. It is also possible to operate the brake device 10 and the parking brake to keep the vehicle 1 in a stopped state. In a case where the transmission of the power plant 6 includes a parking lock mechanism, the parking lock mechanism can also be operated to keep the vehicle 1 in the stopped state.

The ECU 29 can determine the presence or absence of the braking operation on the brake pedal 7B, based on the detection result of the operation detection sensor 7b. The ECU 28 functioning as an alarm output unit outputs an alarm to the driver of the vehicle 1 when the lighting color of the traffic light is red and there is no braking operation of the vehicle 1. When a plurality of traffic lights are recognized from the image of the camera 41 by processing of the ECU 22 and the ECU 23 (recognition unit), the ECU 28 (alarm output unit) refers to the database 200 of FIG. 7 and controls the output of the alarm based on a combination of lighting colors of the plurality of traffic lights.

[Outline of Processing]

Example of Road Environment in which Vehicle 1 Travels

Figure 5:
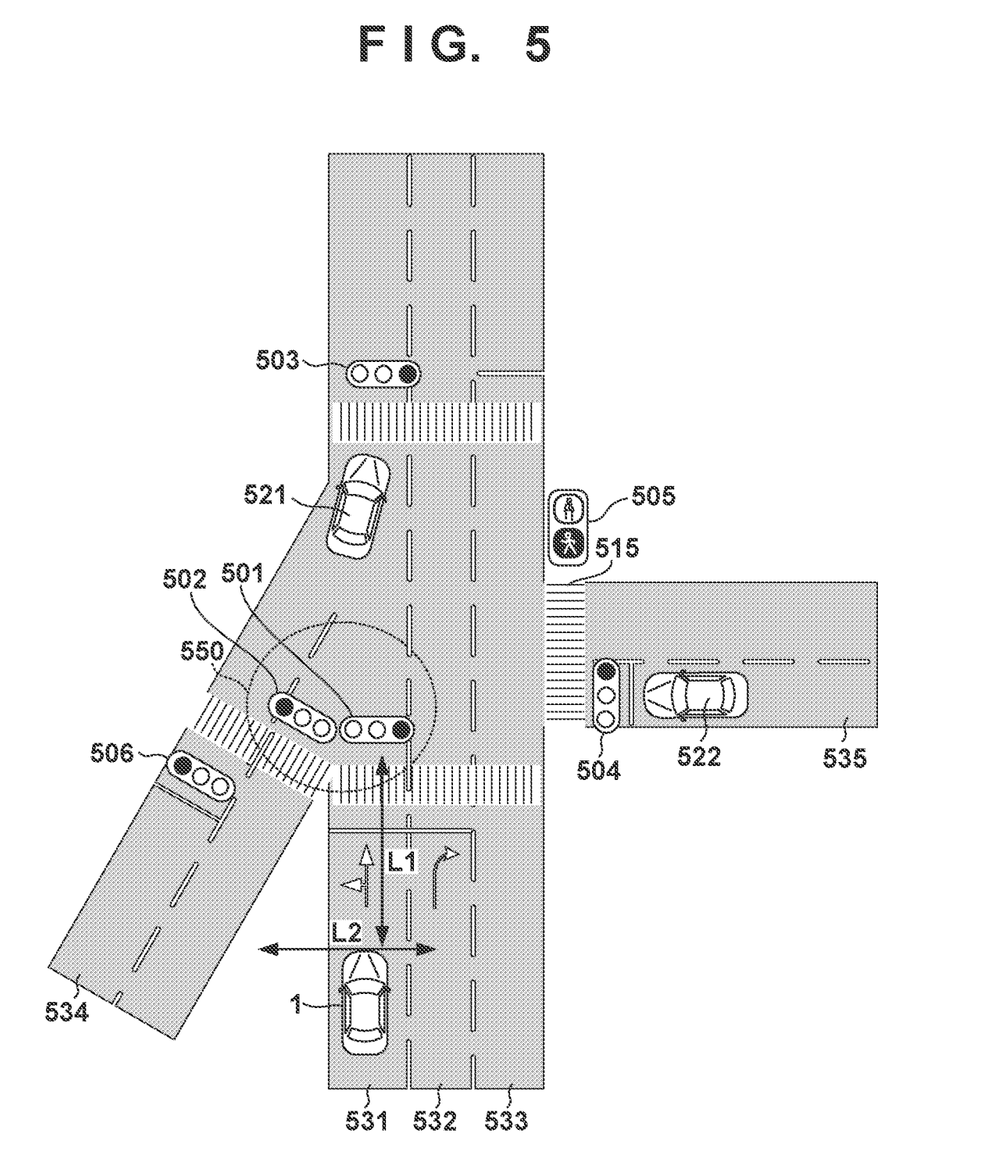
FIG. 5 is a diagram schematically illustrating a road on which a vehicle travels.

Next, an example of a road environment in which the vehicle 1 of the present embodiment travels will be described. FIG. 5 is a diagram schematically illustrating a road environment in which the vehicle 1 travels. In FIG. 5, the vehicle 1 is traveling in a lane 531 where the vehicle 1 can go straight or turn left. Hereinafter, a lane (own lane) where the vehicle 1 travels is also referred to as a self-vehicle road. A lane 532 adjacent to the lane 531 is a right-turn lane, and a lane 533 is an opposite lane.

In FIG. 5, a lane 534 and a lane 535 are intersection lanes intersecting with the lane 531 (self-vehicle road). Hereinafter, the intersection lane is also referred to as an intersection road. A vehicle 521 is a vehicle that merges into the lane 531 from the lane 534 (intersection lane), and a vehicle 522 is a vehicle in a stopped state by a red light of a traffic light 504.

Traffic lights 501 and 503 are disposed in front of the lane 531 (self-vehicle road), and traffic lights 502 and 506 are disposed in the lane 534 (intersection lane). Further, the traffic light 504 is disposed in a lane 535 (intersection lane), and a pedestrian traffic light 505 is disposed on a crosswalk 515. In FIG. 5, L1 represents a distance in the longitudinal direction along the traveling direction of the vehicle 1, and L2 represents a distance in the lateral direction along the vehicle width direction of the vehicle 1. Hereinafter, the distance in the longitudinal direction is also referred to as a longitudinal distance, and the distance in the lateral direction is also referred to as a lateral distance.

(Processing Flow)

Figure 2:
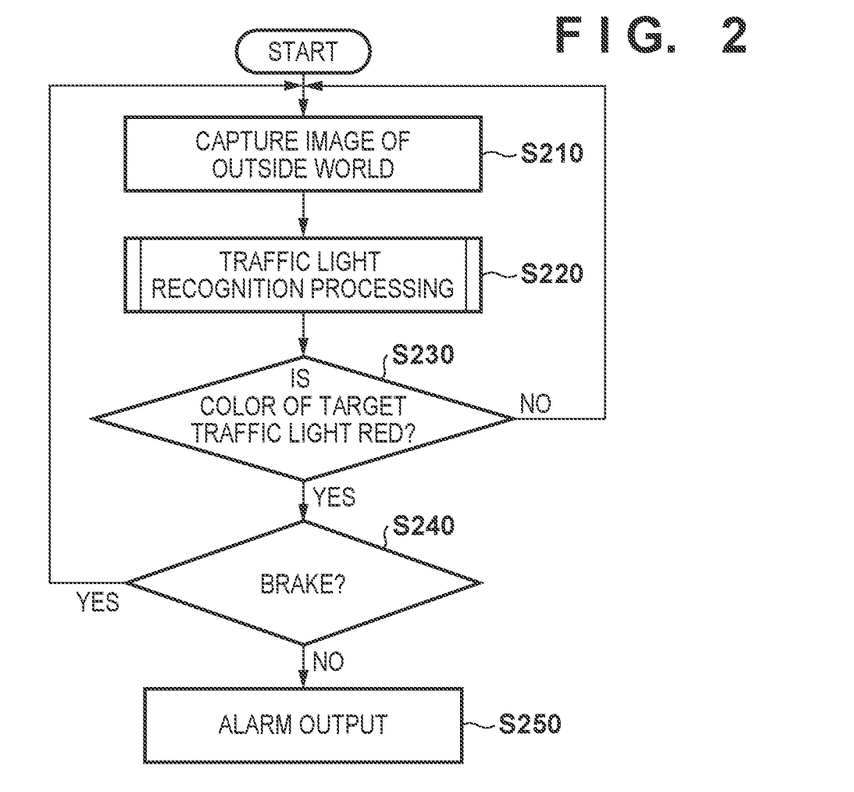
FIG. 2 is a diagram illustrating a flow of processing of a driving assistance device according to an embodiment.

Next, a flow of processing executed by the driving assistance device 2 will be described. FIG. 2 is a diagram illustrating a flow of processing of the driving assistance device 2 according to the embodiment. First, in step S210, the camera 41 captures an image of the outside world of the vehicle 1.

Then, in step S220, the recognition unit (ECUs 22 and 23) recognizes the display of a traffic light included in the image (captured image) captured by the camera 41. The recognition unit (ECUs 22 and 23) extracts the traffic light included in the captured image by performing image processing on the captured image, and recognizes the display (lighting color) of the extracted traffic light.

(Traffic Light Recognition Processing)

Figure 3:
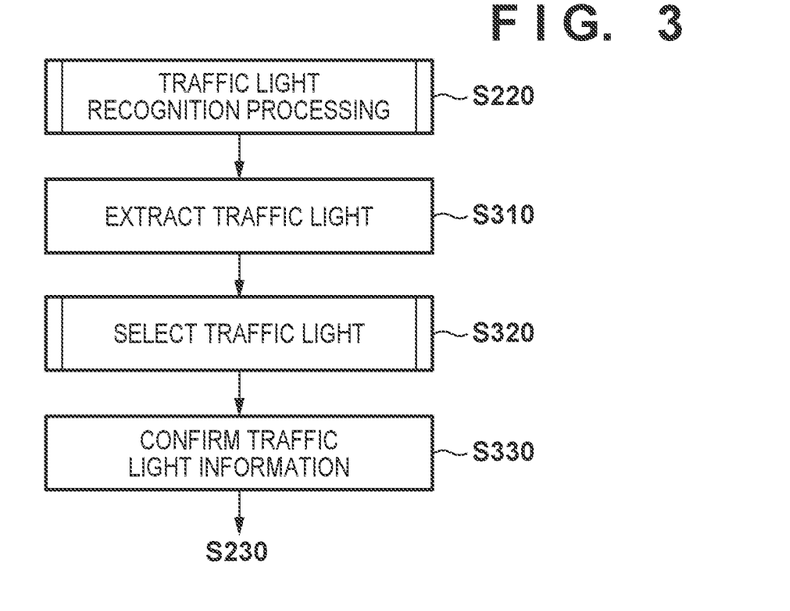
FIG. 3 is a diagram illustrating a flow of traffic light recognition processing.

FIG. 3 is a diagram illustrating a specific flow of the traffic light recognition processing in step S220. In step S310, the recognition unit (ECUs 22 and 23) extracts the traffic light included in the captured image. In this step, in order to exclude a pedestrian traffic light, a traffic light disposed at a position equal to or higher than a predetermined height (for example, 3 m) from a road surface is set as an extraction target. For example, in FIG. 5, the pedestrian traffic light 505 is excluded from the extraction targets.

In order to previously exclude a traffic light having a low degree of influence on the control of the driving assistance device 2, a traffic light disposed within a range (for example, a lateral distance L2=±6 m) of a predetermined lateral distance L2 with respect to the center of the vehicle width of the vehicle 1 (self-device) is set as the extraction target. For example, in FIG. 5, the traffic light 504 and the traffic light 506 are excluded from the extraction targets. By performing the preprocessing described in this step, the traffic lights 501, 502, and 503 are extracted in FIG. 5, for example.

In step S320, the recognition unit (ECUs 22 and 23) selects a traffic light (target traffic light) to be used for control of the driving assistance device 2 from the traffic lights 501, 502, and 503 extracted by the processing in step S310.

Figure 4:
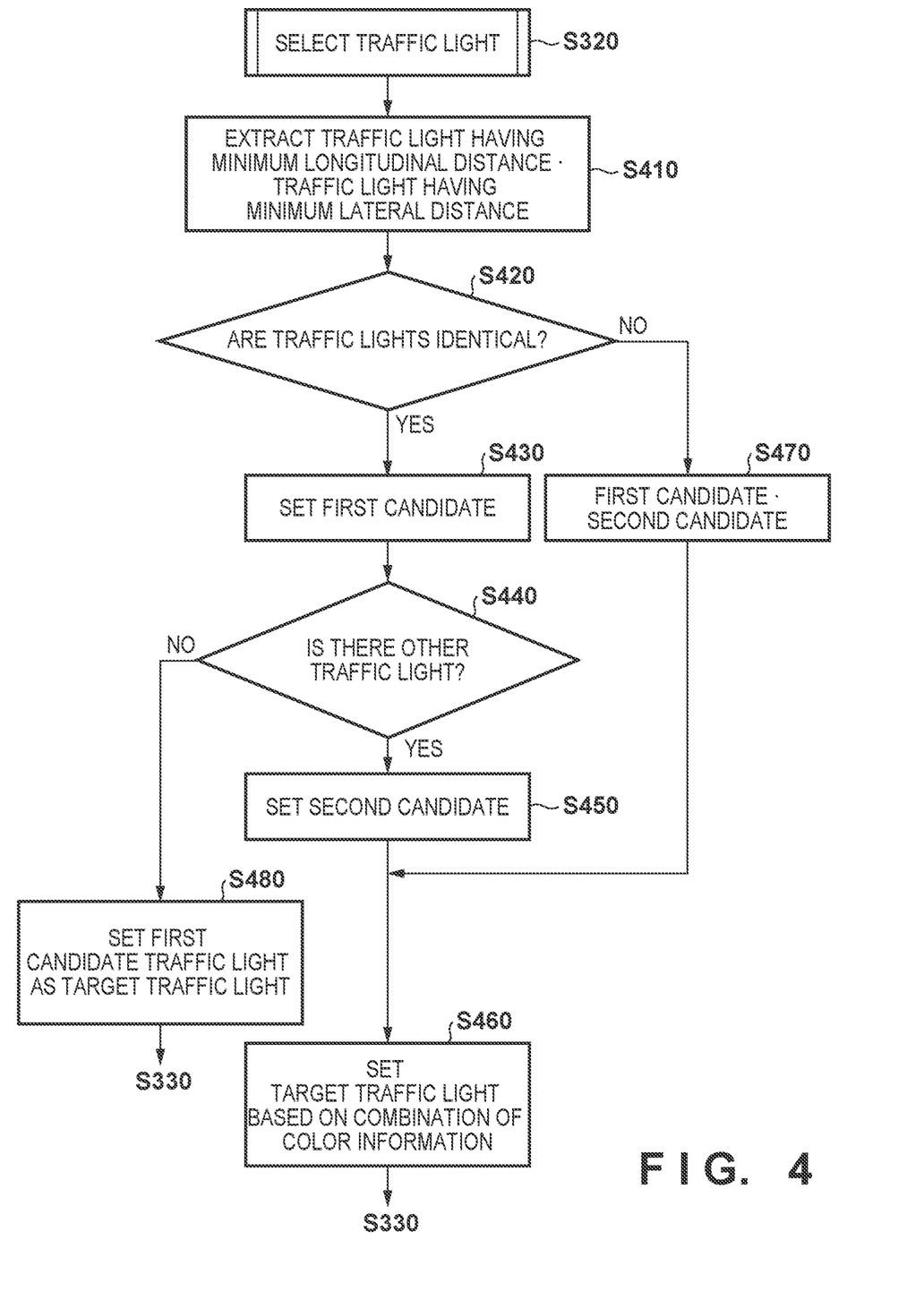
FIG. 4 is a diagram illustrating a flow of traffic light selection processing.

FIG. 4 is a diagram illustrating a flow of the traffic light selection processing in step S320. The recognition unit (ECUs 22 and 23) acquires (sets) a first candidate traffic light and a second candidate traffic light by using the distance L1 in the longitudinal direction along the traveling direction of the vehicle and the distance L2 in the lateral direction along the vehicle width direction of the vehicle, which are detected by the detection unit (42 and 43).

In step S410, the recognition unit (ECUs 22 and 23) extracts a traffic light having the minimum longitudinal distance L1 and a traffic light having the minimum lateral distance L2 from the plurality of traffic lights (501, 502 and 503) included in the captured image.

In step S420, the recognition unit (ECUs 22 and 23) determines whether or not the traffic lights at which the longitudinal distance L1 and the lateral distance L2 are minimum are identical to each other. When the traffic lights having the minimum longitudinal distance L1 and lateral distance L2 are not identical to each other (S420-NO), the recognition unit (ECUs 22 and 23) advances the processing to step S470.

Then, in step S470, the recognition unit (ECUs 22 and 23) sets, for example, the traffic light having the minimum longitudinal distance L1 as the first candidate traffic light and the traffic light having the minimum lateral distance L2 as the second candidate traffic light, and advances the processing to step S460. Note that the settings of the first candidate traffic light and the second candidate traffic light may be reversed.

On the other hand, in the determination processing of step S420, when the traffic lights at which the longitudinal distance L1 and the lateral distance L2 are minimum are identical to each other (S420-YES), the recognition unit (ECUs 22 and 23) advances the processing to step S430.

Then, in step S430, the recognition unit (ECUs 22 and 23) sets, as the first candidate traffic light, a traffic light having the minimum longitudinal distance L1 and having the minimum lateral distance L2. For example, in FIG. 5, the traffic light having the minimum longitudinal distance L1 and the minimum lateral distance L2 is a traffic light 501, and the recognition unit (ECUs 22 and 23) sets the traffic light 501 as the first candidate traffic light.

In step S440, the recognition unit (ECUs 22 and 23) determines whether or not another traffic light exists around the first candidate traffic light (traffic light 501), based on the distance L2 in the lateral direction. When another traffic light does not exist (S440-NO), the recognition unit (ECUs 22 and 23) advances the processing to step S480.

Then, in step S480, the recognition unit (ECUs 22 and 23) sets the first candidate traffic light set in step S430 as a target traffic light to be used for control of the driving assistance device 2, and advances the processing to step S330.

In step S330 of FIG. 3, the recognition unit (ECUs 22 and 23) confirms a lighting color (color information) of the target traffic light (the first candidate traffic light (traffic light 501)), and advances the processing to step S230 of FIG. 2.

On the other hand, when another traffic light exists around the first candidate traffic light (traffic light 501), based on the distance L2 in the lateral direction in the determination in step S440 of FIG. 4 (S440-YES), the recognition unit (ECUs 22 and 23) advances the processing to step S450.

In step S450, the recognition unit (ECUs 22 and 23) sets another traffic light existing around the first candidate traffic light (traffic light 501) as the second candidate traffic light, based on the distance L2 in the lateral direction. For example, in FIG. 5, the traffic light 502 is disposed at a position within the lateral distance L2 around the first candidate traffic light (traffic light 501), and the recognition unit (ECUs 22 and 23) sets the traffic light 502 as the second candidate traffic light.

Depending on the setting of the distance L2 in the lateral direction, a plurality of other traffic lights may exist around the first candidate traffic light. In such a case, the recognition unit (ECUs 22 and 23) may change the setting of the distance L2 in the lateral direction from an initial value to a gradually shorter distance so as to limit the plurality of other traffic lights to one traffic light, and finally set the other traffic light limited to one traffic light as the second candidate traffic light.

Figure 6:
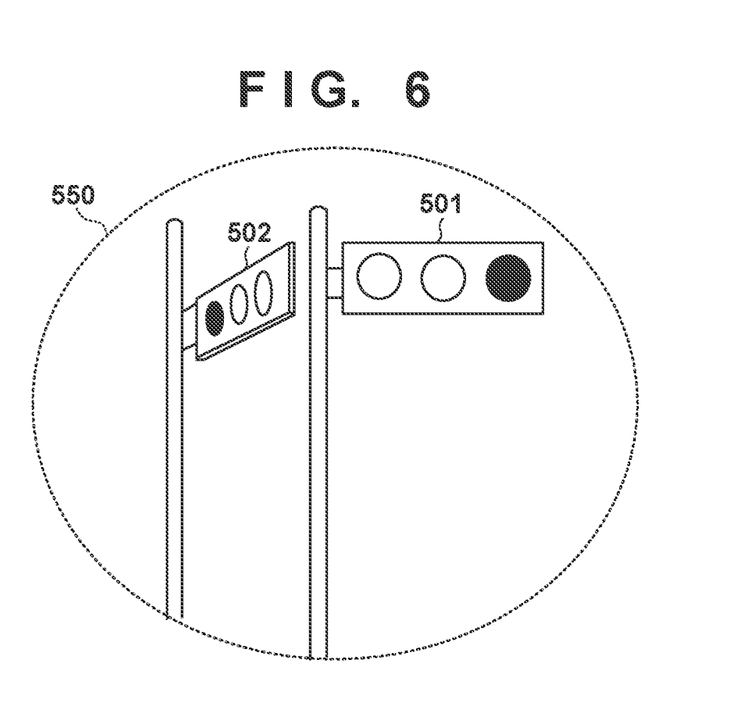
FIG. 6 is a diagram schematically illustrating a first candidate traffic light and a second candidate traffic light.

FIG. 6 is a diagram schematically illustrating the first candidate traffic light (traffic light 501) and the second candidate traffic light (traffic light 502) located within a range of an area 550 in FIG. 5. The second candidate traffic light (traffic light 502) is a traffic light disposed in the lane 534 (intersection lane). For this reason, due to various factors such as an influence of an intersection angle, a road environment of a surrounding environment, a sunshine condition, and a weather condition, the recognition unit (ECUs 22 and 23) may have difficulty in recognizing the lighting color of the traffic light 502 as compared with the first candidate traffic light (traffic light 501) existing in front of the self-vehicle.

In the logic of the alarm output in the driving assistance device 2 of the present embodiment, as described in the following step S460, by setting the target traffic light to be used for control of the driving assistance device 2 based on a combination of lighting colors (color information) of a plurality of traffic lights (FIG. 7), alarm output performance is enhanced so that an alarm can be output in a state where an alarm is required even under the influence of the various factors.

In step S460, the recognition unit (ECUs 22 and 23) sets the target traffic light to be used for control of the driving assistance device 2 based on a combination of lighting colors (color information) of the first candidate traffic light and the second candidate traffic light (FIG. 7).

In the database 200 of FIG. 7, a "first candidate" indicates that the first candidate traffic light is used as the target traffic light, and a "second candidate" indicates that the second candidate traffic light is used as the target traffic light. "None" indicates that there is no setting of the target traffic light.

For example, when the lighting color of the first candidate traffic light is red and the lighting color of the second candidate traffic light is red or unknown, the recognition unit (ECUs 22 and 23) sets the first candidate traffic light as the target traffic light to be used for control of the driving assistance device 2.

When the lighting color of the first candidate traffic light is unknown and the lighting color of the second candidate traffic light is red, the recognition unit (ECUs 22 and 23) sets the second candidate traffic light as the target traffic light to be used for control of the driving assistance device 2. The recognition unit (ECUs 22 and 23) refers to the database 200, sets the target traffic light to be used for control of the driving assistance device 2 based on a combination of lighting colors (color information) (FIG. 7), and advances the processing to step S330.

In step S330 of FIG. 3, the recognition unit (ECUs 22 and 23) confirms the lighting color (color information) of the target traffic light set by referring to the database 200, and advances the processing to step S230 of FIG. 2.

In step S230 of FIG. 2, the recognition unit (ECUs 22 and 23) determines whether or not the lighting color (color information) of the target traffic light is red. When the lighting color (color information) of the target traffic light is not red (S230-NO), the recognition unit (ECUs 22 and 23) returns the processing to step S210 and repeats the similar processing.

On the other hand, when the lighting color (color information) of the target traffic light is red in the determination processing of step S230 (S230-YES), the recognition unit (ECUs 22 and 23) advances the processing to step S240.

Then, in step S240, the ECU 29 determines the presence or absence of the braking operation on the brake pedal 7B, based on the detection result of the operation detection sensor 7b. When the braking operation is performed (S240-YES), the ECU 29 returns the processing to step S210, and the recognition unit (ECUs 22 and 23) similarly repeats the processing of S210 and subsequent steps.

On the other hand, in the determination processing of step S240, when there is no braking operation (S240-NO), the ECU 29 advances the processing to step S250.

In step S250, the alarm output unit (ECU 28) outputs an alarm to the driver of the vehicle 1 when the lighting color of the traffic light (target traffic light) is red and there is no braking operation of the vehicle 1.

For example, when the first candidate traffic light (for example, the traffic light 501) is set as the target traffic light in step S480 of FIG. 4, the alarm output unit (ECU 28) determines whether or not an alarm is necessary based on the lighting color of the first candidate traffic light (target traffic light), and outputs an alarm to the driver of the vehicle 1 when the lighting color is red and there is no braking operation of the vehicle 1.

In addition, in a case where the target traffic light is set based on the combination of the color information in step S460 of FIG. 4, the alarm output unit (ECU 28) outputs an alarm to the driver of the vehicle 1 when the lighting color of the target traffic light set by referring to the database 200 (FIG. 7) is red and there is no braking operation of the vehicle 1.

When the target traffic light is set based on a combination of the lighting colors (color information) of the first candidate traffic light and the second candidate traffic light, the alarm output unit (ECU 28) outputs an alarm for a combination of lighting colors shaded in FIG. 7.

For example, when the lighting color of the first candidate traffic light is red and the lighting color of the second candidate traffic light is red or unknown, the recognition unit (ECUs 22 and 23) sets the first candidate traffic light as the target traffic light to be used for control of the driving assistance device 2. In this case, the alarm output unit (ECU 28) determines where or not the alarm is necessary based on the lighting color of the first candidate traffic light, and outputs the alarm to the driver of the vehicle 1 when the lighting color is red and there is no braking operation of the vehicle 1.

When the lighting color of the first candidate traffic light is unknown and the lighting color of the second candidate traffic light is red, the recognition unit (ECUs 22 and 23) sets the second candidate traffic light as the target traffic light to be used for control of the driving assistance device 2. The alarm output unit (ECU 28) determines where or not the alarm is necessary based on the lighting color of the second candidate traffic light, and outputs the alarm to the driver of the vehicle 1 when the lighting color is red and there is no braking operation of the vehicle 1.

Here, the state in which the lighting color is "unknown" is a state in which the lighting color is not actively recognized as red due to various factors when an image is captured by the camera 41. Further, the state in which the lighting color is "unknown" is a state in which the lighting color is not actively recognized as yellow or green. That is, the state in which the lighting color is "unknown" is an intermediate state in which there is a possibility that the lighting color is passively recognized as red in a case where various factors at the time of capturing an image are reduced. As described above, according to the driving assistance device 2 of the present embodiment, even in a case where the lighting color of any one of the first candidate traffic light and the second candidate traffic light is unknown, when the lighting color of the other traffic light is red, the traffic light can be set as the target traffic light and an alarm can be output. As a result, alarm output performance can be enhanced, and more excellent driving assistance technology can be provided from the viewpoint of preventive safety.

When the lighting color of the first candidate traffic light is yellow or green, the alarm output unit (ECU 28) suppresses the alarm output regardless of the lighting color of the second candidate traffic light. As a result, when the lighting color of the first candidate traffic light is not red, it is possible to limit excessive alarm output to the driver by actively suppressing the alarm output. With the above processing, a series of processing in the driving assistance device 2 ends.

Example of Alarm Output

Figure 8:
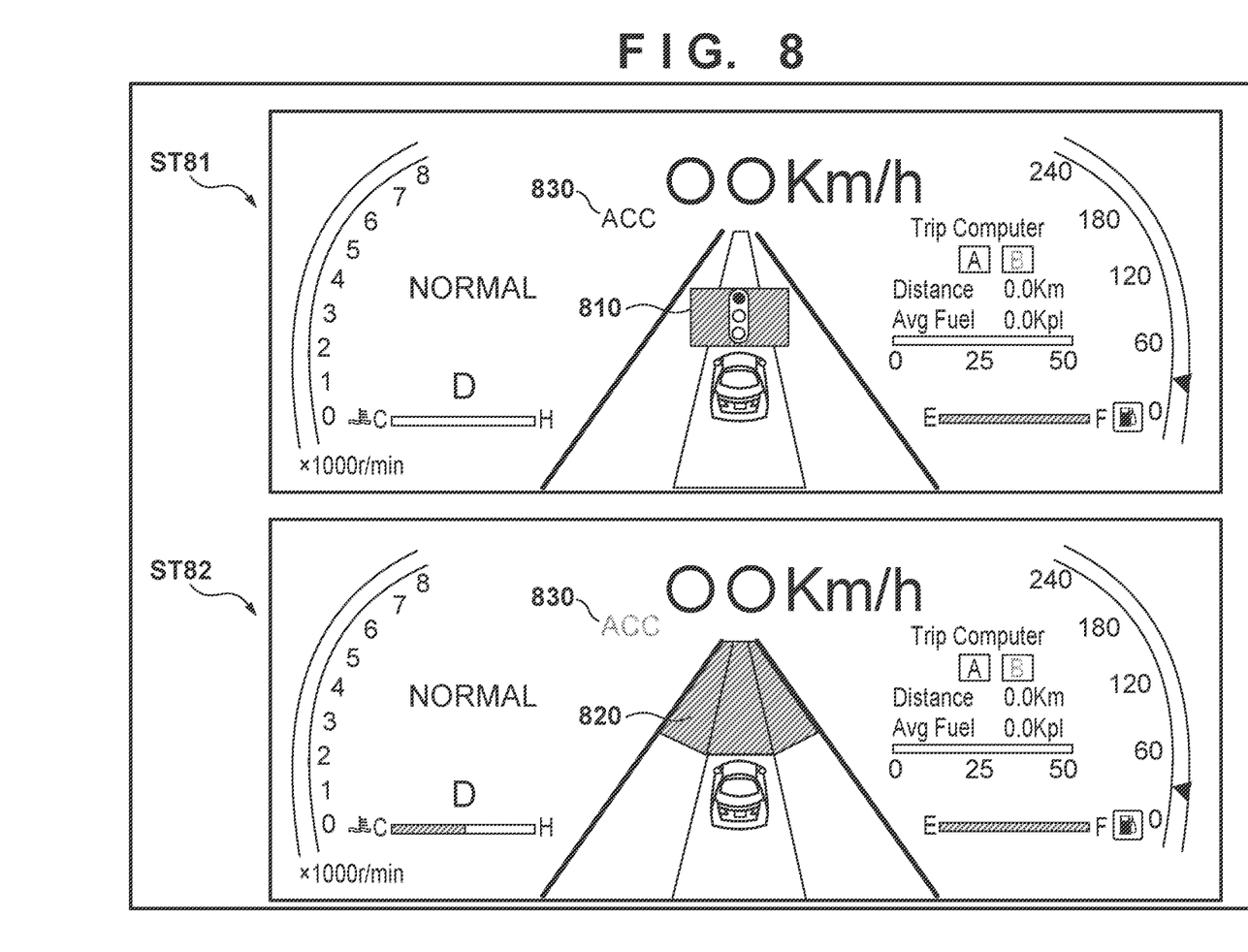
FIG. 8 is a diagram illustrating an example of alarm output display.
Figure 9:
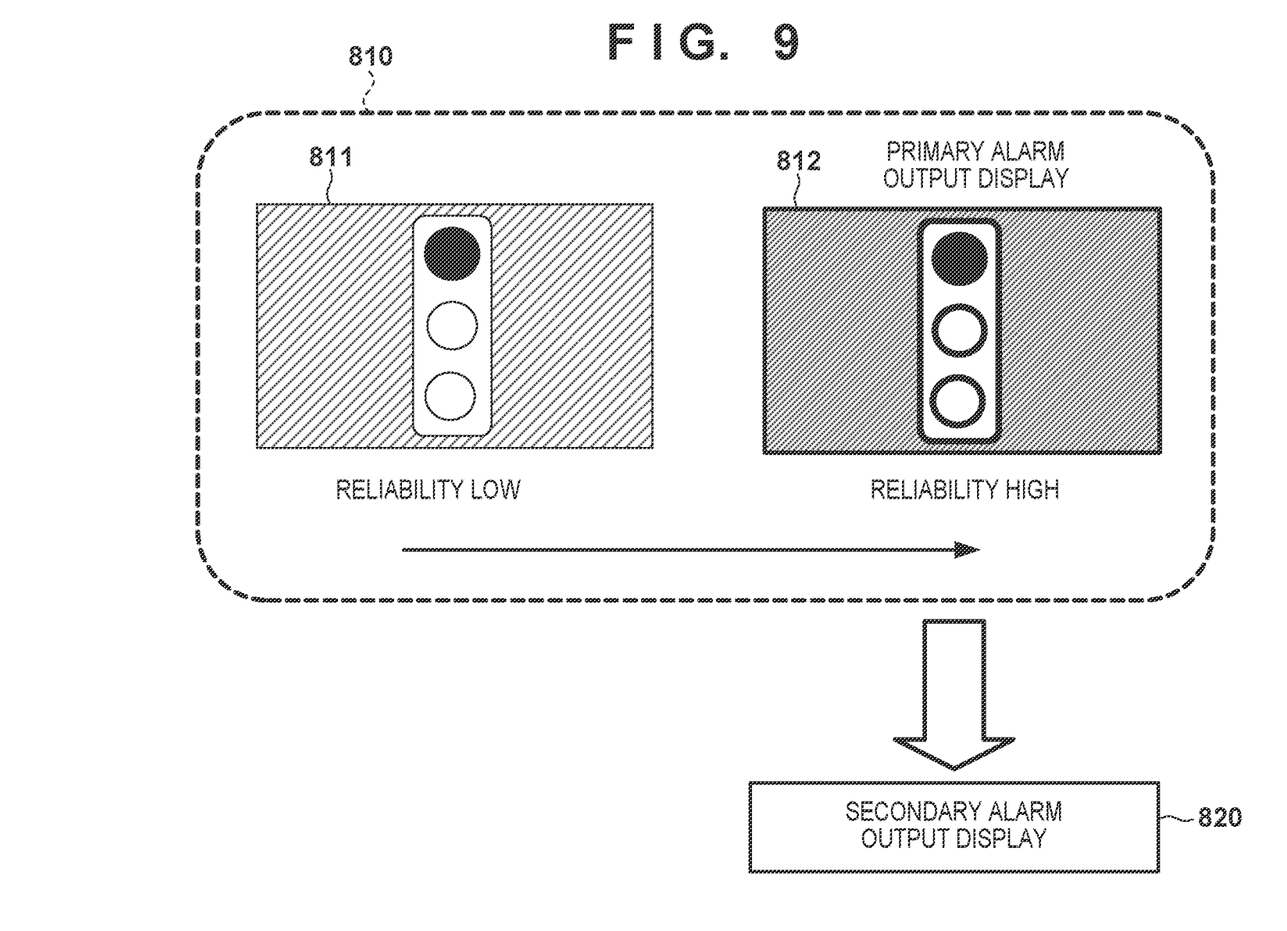
FIG. 9 is a diagram illustrating switching from primary alarm output display to secondary alarm output display.

FIG. 8 is a diagram illustrating an example of the alarm output display output in step S250. In FIG. 8, ST81 illustrates a display example of primary alarm output display 810, and ST82 illustrates a display example of secondary alarm output display 820. FIG. 9 is a diagram illustrating switching from the primary alarm output display 810 to the secondary alarm output display 820. The alarm output unit (ECU 28) performs display control of screen display (FIGS. 8 and 9) on the display device 92.

The reliability (recognition accuracy) of target recognition based on the image captured by the camera 41 is a parameter that can vary due to various factors such as an influence of an intersection angle between the self-vehicle road and the intersection road, a road environment of a surrounding environment such as a part of street trees covering traffic lights, an influence of sunshine conditions such as a sunset, the presence of a preceding vehicle with a high vehicle height, and weather conditions such as a rainfall and a snowfall.

In the driving assistance device 2 of the present embodiment, in order to obtain the reliability (recognition accuracy) of target recognition, for example, the recognition unit (ECUs 22 and 23) can calculate the recognition accuracy of the traffic light by comparing (P2/P1) an image feature amount (P1) as a reference for recognizing the traffic light with an image feature amount (P2) of the traffic light acquired (recognized) from the image captured by the camera 41 during traveling.

Here, the image feature amount includes parameters such as luminance, brightness, and saturation of a pixel related to a lighting color (red) of interest. The image feature amount can also include an area (pixel value) of a lighting portion of the traffic light. For example, the recognition accuracy may be calculated by setting the area (pixel value) of the lighting portion of the traffic light captured in the reference state as P1, and setting the area (pixel value) of the lighting portion of the traffic light acquired (recognized) from the image captured during traveling as P2.

Then, the alarm output unit (ECU 28) changes a display mode (FIGS. 9: 811 and 812) of the primary alarm output display 810 according to the calculated recognition accuracy. In a detection state (FIG. 9: 812) in which the predetermined reliability (recognition accuracy) is secured, when the lighting color of the target traffic light is red and there is no braking operation of the vehicle 1, the alarm output unit (ECU 28) displays, on the display device 92, the secondary alarm output display 820 in which the display area is enlarged as compared with the primary alarm output display 810.

As illustrated in 811 and 812 of FIG. 9, the alarm output unit (ECU 28) changes the display mode of the primary alarm output display 810 depending on a level of the reliability (recognition accuracy) of the target recognition, and performs the display.

The alarm output unit (ECU 28) highlights (changes) a contour line or a degree of shading of the primary alarm output display 810 as the recognition accuracy changes from the detection state (811) of the red light in which the recognition accuracy is low to the detection state (812) of the red light in which higher predetermined recognition accuracy is secured, and performs the display. Here, the detection state in which the recognition accuracy is low is a detection state satisfying a lower limit threshold of the recognition accuracy, and the detection state in which the recognition accuracy is secured is a detection state satisfying an upper limit threshold of the recognition accuracy. The lower limit threshold and the upper limit threshold are parameters that can be arbitrarily set, and for example, the lower limit threshold and the upper limit threshold can be set to X1% and X2 (>X1) %, respectively, with respect to recognition accuracy of 100% (MAX).

Note that the change of the display mode is not limited to the change of the thickness of the contour line, and the line type such as broken line display may be changed. In addition, the display color may be changed without being limited to the change of the degree of shading of a background color. For example, in a state where the reliability is low, the contour line is displayed with a thin line and the background color is displayed with a light red color, and in a state where the reliability is higher, the contour line is displayed with a thick line and the background color is displayed with a dark red color, so that the display can be performed so as to call attention to the front.

In the detection state (812) of the red light in which higher predetermined recognition accuracy is secured, when there is no braking operation, the alarm output unit (ECU 28) displays the secondary alarm output display 820 on the display device 92.

On the assumption that the state of the red light recognized under predetermined reliability (recognition accuracy) is recognized, the alarm output unit (ECU 28) displays the secondary alarm output display 820. Therefore, in order to notify higher urgency, the display area of the shaded secondary alarm output display 820 (ST82) is enlarged as compared with the display area of the primary alarm output display 810. Since the red light is assumed, an icon indicating the red light is not displayed in the secondary alarm output display 820. In ST81, ACC display 830 indicating an operation state of inter-vehicle distance control (ACC) is in a lighting state. However, in ST82, the inter-vehicle distance control (ACC) is in a non-operation state, and the ACC display 830 is in a non-lighting state.

According to the present embodiment, by changing the display mode (FIGS. 9: 811 and 812) of the primary alarm output display 810 according to the recognition accuracy of the traffic light, the recognition accuracy of the traffic light that can vary can be reflected in the visualized alarm output display. In addition, by displaying the secondary alarm output display 820 in which the display area is enlarged as compared with the primary alarm output display 810, it is possible to notify the driver of an emergency state in which the red light state is recognized under predetermined reliability (recognition accuracy) and the braking operation is not performed. As a result, from the viewpoint of preventive safety, it is possible to provide driving assistance technology with enhanced alarm output performance even under an influence of various factors.

Summary of Embodiments

The above embodiments disclose at least the following driving assistance device, vehicle, driving assistance method, and storage medium.

Configuration 1. A driving assistance device according to the embodiments described above is a driving assistance (2) comprising:

a recognition unit (22,23) configured to recognize a lighting color of a traffic light from an image captured by a camera (41) that images an outside world of a vehicle; and an alarm output unit (28) configured to output an alarm to a driver of the vehicle when the lighting color is red and there is no braking operation of the vehicle, wherein, when a plurality of traffic lights are recognized from the image by processing of the recognition unit, the alarm output unit (28) controls the output of the alarm based on a combination of lighting colors of the plurality of traffic lights.

With the driver assistance device according to configuration 1, the configuration 1 provides driving assistance technology capable of controlling output of an alarm based on a combination of lighting colors of a plurality of traffic lights when the plurality of traffic lights are recognized.

Configuration 2. The plurality of traffic lights include at least a first candidate traffic light located in front of a traveling lane of the vehicle and a second candidate traffic light located around the first candidate traffic light, and when a lighting color of the first candidate traffic light is red and a lighting color of the second candidate traffic light is red or unknown, the alarm output unit (28) outputs the alarm based on the lighting color of the first candidate traffic light.

With the driver assistance device according to configuration 2, when the lighting color of the first candidate traffic light is red, it is possible to perform safer driving assistance by outputting the warning more positively.

Configuration 3. When the lighting color of the first candidate traffic light is yellow or green, the alarm output unit (28) suppresses the output of the alarm regardless of the lighting color of the second candidate traffic light.

With the driver assistance device according to configuration 3, when the lighting color of the first candidate traffic light is yellow or green, the alarm output unit (ECU 28) suppresses the alarm output regardless of the lighting color of the second candidate traffic light. As a result, when the lighting color of the first candidate traffic light is not red, it is possible to limit excessive alarm output to the driver by actively suppressing the alarm output.

Configuration 4. The driving assistance device, further comprising: a detection unit (42, 43) configured to detect a distance from a target around the vehicle, wherein the recognition unit acquires the first candidate traffic light and the second candidate traffic light by using a distance in a longitudinal direction along a traveling direction of the vehicle and a distance in a lateral direction along a vehicle width direction of the vehicle, detected by the detection unit.

With the driver assistance device according to configuration 4, by using the distance information (longitudinal distance, lateral distance) with respect to the vehicle (self-vehicle), it is possible to acquire traffic signal candidates that match the route on which the vehicle (self-vehicle) travels.

Configuration 5. The recognition unit compares a reference image feature amount for recognizing a traffic light with an image feature amount of the traffic light acquired from the image and calculates recognition accuracy of the traffic light, and the alarm output unit (28) changes a display mode (FIGS. 9: 811 and 812) of primary alarm output display (810; FIGS. 8 and 9) output as the alarm according to the recognition accuracy.

With the driver assistance device according to configuration 5, by changing the display mode (FIGS. 9: 811 and 812) of the primary alarm output display 810 according to the recognition accuracy of the traffic light, the recognition accuracy of the traffic light that can vary can be reflected in the visualized alarm output display.

Configuration 6. In a detection state in which predetermined recognition accuracy is secured, when the lighting color is red and there is no braking operation of the vehicle, the alarm output unit (28) displays secondary alarm output display (820; FIGS. 8 and 9) in which a display area is enlarged as compared with the primary alarm output display (810; FIGS. 8 and 9).

With the driver assistance device according to configuration 6, in addition, by displaying the secondary alarm output display 820 in which the display area is enlarged as compared with the primary alarm output display 810, it is possible to notify the driver of an emergency state in which the red light state is recognized under predetermined reliability (recognition accuracy) and the braking operation is not performed. As a result, from the viewpoint of preventive safety, it is possible to provide driving assistance technology with enhanced alarm output performance even under an influence of various factors.

Configuration 7. The recognition unit sets, as the first candidate traffic light (501), a traffic light having a minimum distance in the longitudinal direction (L1) and having a minimum distance in the lateral direction (L2), and sets another traffic light located around the first candidate traffic light as the second candidate traffic light (502), based on the distance in the lateral direction.

With the driver assistance device according to configuration 7, by setting other traffic light located around the first candidate traffic light as the second candidate traffic lights, it is possible to control the output of the warning based on the combination of lighting colors of the plurality of traffic lights.

Configuration 8. A vehicle (1) according to the embodiments described above comprises the driving assistance device (2) according to any one of the configurations 1 to 7 described above.

With the driver assistance device according to configuration 8, it is possible to provide a vehicle having the driving support device. The configuration 8 also provides driving assistance technology capable of controlling output of an alarm based on a combination of lighting colors of a plurality of traffic lights when the plurality of traffic lights are recognized.

Configuration 9. A driving assistance method according to the embodiments described above is a driving assistance method of a driving assistance device, comprising:

recognizing (S220) a lighting color of a traffic light from an image captured by an image capturing unit that images an outside world of a vehicle; and outputting (S250) an alarm to a driver of the vehicle when the lighting color is red and there is no braking operation of the vehicle, wherein, in the output, when a plurality of traffic lights are recognized from the image by processing in the recognition, the output of the alarm is controlled based on a combination of lighting colors of the plurality of traffic lights.

With the driving assistance method according to configuration 9, the configuration 9 provides driving assistance technology capable of controlling output of an alarm based on a combination of lighting colors of a plurality of traffic lights when the plurality of traffic lights are recognized.

Configuration 10. A storage medium according to the embodiments described above is a non-transitory computer readable storage medium storing a program for causing a computer to execute each step of the driving assistance method according to the configuration 9 described above.

With the storage medium according to configuration 10, it is possible to provide a storage medium storing a program for causing a computer to execute each step of the driving support method of the configuration 9 described above.

Other Embodiments

In the present invention, a program for realizing the functions of the above-described embodiments can be provided to a system or a driving assistance device via a network or a storage medium, and one or more processors in a computer of the system or the driving assistance device can read the program to execute processing of the driving assistance device.

The invention is not limited to the foregoing embodiments, and various variations/changes are possible within the spirit of the invention.

What is claimed is:

1. A driving assistance device comprising:

a recognition unit configured to recognize a lighting color of a traffic light from an image captured by a camera that images an outside world of a vehicle; and an alarm output unit configured to output an alarm to a driver of the vehicle when the lighting color is red and there is no braking operation of the vehicle, wherein, the recognition unit compares a reference image feature amount for recognizing a traffic light with an image feature amount of the traffic light acquired from the image and calculates recognition accuracy of the traffic light, and when a plurality of traffic lights are recognized from the image by processing of the recognition unit, the alarm output unit controls the output of the alarm based on a combination of lighting colors of the plurality of traffic lights, and changes a display mode of primary alarm output display output as the alarm according to the recognition accuracy.

2. The driving assistance device according to claim 1, wherein the plurality of traffic lights include at least a first candidate traffic light located in front of a traveling lane of the vehicle and a second candidate traffic light located around the first candidate traffic light, and when a lighting color of the first candidate traffic light is red and a lighting color of the second candidate traffic light is red or unknown, the alarm output unit outputs the alarm based on the lighting color of the first candidate traffic light.

3. The driving assistance device according to claim 2, wherein when the lighting color of the first candidate traffic light is yellow or green, the alarm output unit suppresses the output of the alarm regardless of the lighting color of the second candidate traffic light.

4. The driving assistance device according to claim 2, further comprising: a detection unit configured to detect a distance from a target around the vehicle, wherein the recognition unit acquires the first candidate traffic light and the second candidate traffic light by using a distance in a longitudinal direction along a traveling direction of the vehicle and a distance in a lateral direction along a vehicle width direction of the vehicle, detected by the detection unit.

5. The driving assistance device according to claim 1, wherein in a detection state in which predetermined recognition accuracy is secured, when the lighting color is red and there is no braking operation of the vehicle, the alarm output unit displays secondary alarm output display in which a display area is enlarged as compared with the primary alarm output display.

6. The driving assistance device according to claim 4, wherein the recognition unit sets, as the first candidate traffic light, a traffic light having a minimum distance in the longitudinal direction and having a minimum distance in the lateral direction, and sets another traffic light located around the first candidate traffic light as the second candidate traffic light, based on the distance in the lateral direction.

7. A vehicle comprising
the driving assistance device according to claim 1.

8. A driving assistance method of a driving assistance device, comprising:

recognizing a lighting color of a traffic light from an image captured by an image capturing unit that images an outside world of a vehicle; and outputting an alarm to a driver of the vehicle when the lighting color is red and there is no braking operation of the vehicle;

comparing a reference image feature amount for recognizing a traffic light with an image feature amount of the traffic light acquired from the image; and calculating recognition accuracy of the traffic light, wherein, in the output, when a plurality of traffic lights are recognized from the image by processing in the recognition, the output of the alarm is controlled based on a combination of lighting colors of the plurality of traffic lights, and a display mode of primary alarm output display output as the alarm is changed according to the recognition accuracy.

9. A non-transitory computer readable storage medium storing a program for causing a computer to execute each step of the driving assistance method according to claim 8.

* * * * *